Jan. 6, 1970 P. H. ROTHSCHILD 3,488,416
ELASTIC MELT EXTRUDER AND METHOD OF OPERATION
Filed Sept. 27, 1967
2 Sheets-Sheet 2

INVENTOR.
PAUL H. ROTHSCHILD

United States Patent Office 3,488,416
Patented Jan. 6, 1970

3,488,416
ELASTIC MELT EXTRUDER AND METHOD OF OPERATION
Paul H. Rothschild, Toledo, Ohio, assignor to Owens-Illinois, Inc., a corporation of Ohio
Filed Sept. 27, 1967, Ser. No. 670,930
Int. Cl. B29d 23/04; B29f 3/02, 3/06
U.S. Cl. 264—176                     12 Claims

ABSTRACT OF THE DISCLOSURE

An apparatus and method for plasticizing and extruding visco-elastic plastic materials under controlled conditions of shear strain wherein the visco-elastic material is extruded under the influence of the normal force or "Weissenberg" effect existing in the shearing zone between spaced, confronting faces of two non-concentric rotating elements.

---

The present invention relates to an improved elastic melt extruder; more particularly, this invention pertains to an apparatus and method for plasticizing and extruding plastic materials under controlled and uniform rates of shear strain.

There has recently developed a new type of plasticizing-extruder commonly known as the "elastic melt extruder" utilizing "the normal force effect," i.e., the normal force developed when a visco-elastic material is sheared between a rotating plate (rotor) and a stationary plate (stator), to perform the functions of a conventional plasticizer-extruder. Such an elastic melt extruder is described in "Modern Plastics Magazine" of October 1959, at page 107, in an article by Bryce Maxwell and Anthony J. Scalora.

An elastic melt extruder utilizes a power-driven, rotatable disc (rotor) within a chamber to which solid plastic material is furnished from a supply hopper or the like. A radial face of the disc is spaced through a narrow gap from the corresponding face of an orifice plate (stator) having an exit orifice axially aligned with the dic. As the disc is rotated, the visco-elastic material introduced peripherally of the disc and confined between the radial faces of the disc and the orifice plate is subjected to shearing forces. The material is essentially elastic, and the tendency of the sheared material for elastic recovery after arcuate shearing and stretching between the radial faces effects centipetal flow of material between the disc and the orifice plate toward the central orifice, and the material issues from the orifice under pressure in plasticized condition.

The output rate of an elastic melt extruder depends upon the rate at which shearing is accomplished in the gap of the shearing zone. The shearing zone is the axial gap between the radial faces of the disc and the orifice plate. The shear strain rate is directly proportional to the surface speed of the disc and inversely proportional to the width of the gap.

Thus, superficially, the output rate should be susceptible to increase by merely increasing the speed of the rotor. However, such an increase in speed will, above certain limits, result in thermal degradation of the visco-elastic material because of the much greater surface speed of the rotor at the outer periphery. The consequent increase in the shearing force exerted upon the material and the greater heat developed therein places a definite limitation on the possibility of increasing the output rate by speeding up the rotor rotation.

Decreasing the gap between the rotor and the stator increases the shear strain rate, but decreases the path of flow of plasticized material to the orifice and thus reduces the output. If the gap were of constant width throughout, the shear strain rate would be at a maximum at the outer periphery of the rotor and at a minimum at the center of the rotor, due to lower surface speed of the shearing disc at the center. Increasing the gap width adjacent the extrusion orifice opens up the flow path to actually increase the output of the extruder under proper conditions but this also reduces the shear strain rate. Thus, it is apparent that the output of present elastic melt extruders is limited by the thermal degradation and other melt irregularities that are associated with the shear strain rate gradient that exists at high rotor speeds.

Another disadvantage of the conventional rotor/stator elastic melt extruder is that the shear strain and the shear strain rate are not subject to independent variation. This is serious operational limitation in certain applications involving thermoplastic materials that require high shear strains for homogenization and yet are thermally sensitive to high shear strain rates.

In view of the foregoing, it is an object of the present invention to provide an elastic melt extruder of increased output capability.

Another object of the present invention is to provide an apparatus for melting, plasticizing and extruding visco-elastic materials under controlled conditions of uniform shear strain.

A further object of the present invention is to provide a method of extruding visco-elastic polymers under the conditions of uniform shear strain that exist in a gap between the faces of two parallel plates that are in non-coaxial alignment and rotating in the same direction at equal angular velocities.

Another object is to provide an elastic melt extrusion method for thermoplastic materials wherein the shear strain and shear strain rate are subject to independent variation.

Yet a further object is to provide an elastic melt extrusion apparatus utilizing the normal force existing in a plastic material confined between the faces of two parallel, but non-concentric rotating discs so as to extrude the plastic material through a centrally located orifice in one of the rotating discs under a controlled shear strain rate gradient.

The above and other objects, features and advantages of the present invention will become apparent from the following description taken in conjunction with the drawings wherein.

Before explaining the present invention in detail, it will be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
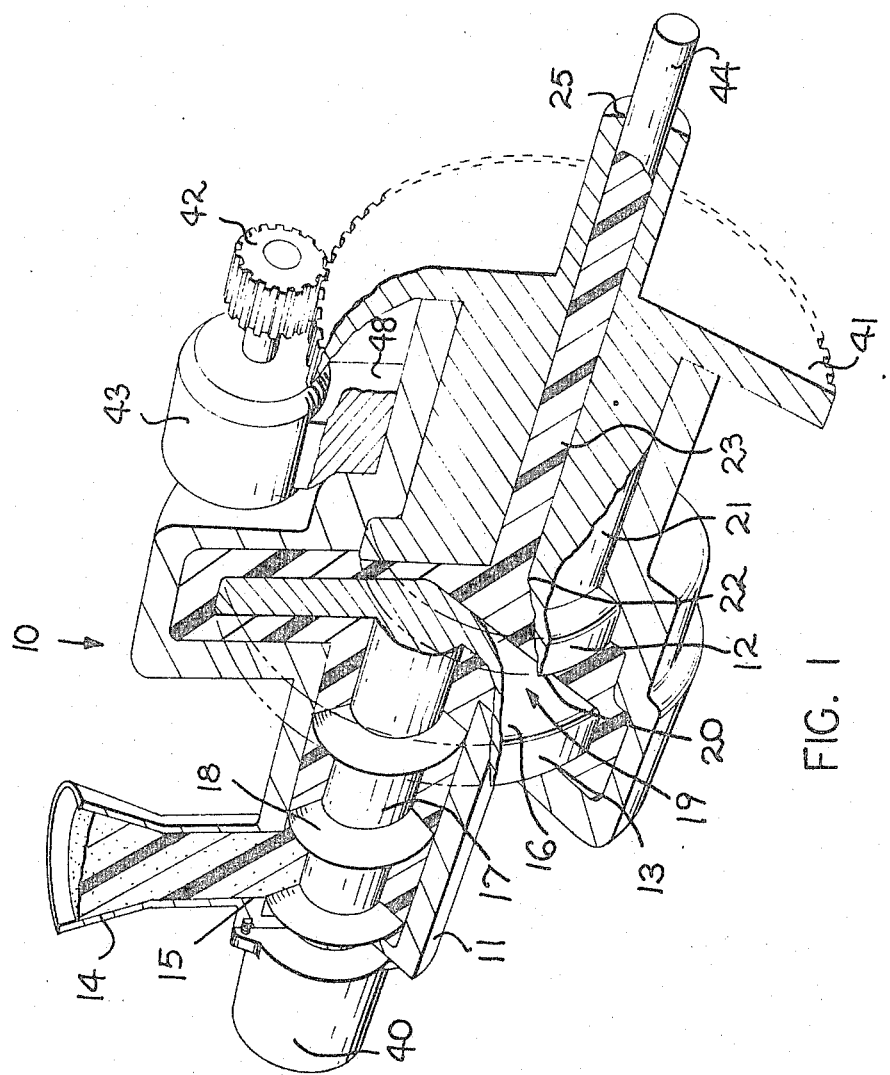
FIG. 1 is a sectional perspective view of one embodiment of the present invention.

In FIG. 1 reference numeral 10 refers generally to an elastic melt extruder. The term "extruder" as used herein refers to a device for plasticizing particulate, solid plastic material to a non-solid, heated, flowable state and issuing the material under pressure for later utilization and/or further processing to form a finished article by well known techniques, such as injection molding, tube or rod drawing, blow molding and the like.

The extruder 10 comprises an outer casing or housing 11 enclosing, axially spaced, confronting, front and rear rotary elements (rotors) or discs 12 and 13 respectively. Confronting discs 12 and 13 are substantially parallel. Mounted on the upper exterior surface of the housing 11 is a feed hopper 14 for containing particulate thermoplastic material. Hopper 14 communicates through a hopper aperture 15 with the interior of the housing 11.

Disposed within the housing is the rearward rotary element 13 in the form of a rotatable disc. This disc is circular in peripheral configuration and has a planar face 16. The rotary disc 13 is driven by means of an axially rearwardly projecting drive shaft 17, extending through an aperture in the rear of the housing and journalled therein. Shaft 17 is provided with a radially helical screw 18 which fits snugly within that section housing communicating with the hopper aperture 15. Alternatively the visco-elastic feed material can be supplied directly from a hopper communicating directly with the shearing gap without the aid of an advancing screw. The end of shaft 17 extends through the rear of the housing and is connected to an electric motor 40 which rotates the shaft 17 in the appropriate direction to cause the helical screw to continually advance the plastic material from the feed hopper aperture toward the rotary elements 12 and 13.

The forward rotary element 12 is also in the form of a disc and has a planar face 20, which confronts face 16 of disc 12. The rotary element 12 is driven by means of an axially forwardly projecting drive shaft 21 extending through an opening in the front of the housing and journalled therein. Drive shaft 21 terminates in abutting relation with gear 41 which gear is driven by pinion 42. Pinion 42 is connected to and driven by a second electric motor 43 which is suitably mounted on base 48. Alternatively, a single motor can be utilized to drive shafts 17 and 21. In the drawings, the planar faces of the rotary elements are shown to be of different sizes. The size and ratio of the sizes of there planar faces is a matter of choice and is usually governed by practicality of design of the extruder housing.

The planar face 20 is centrally apertured at 22 for registry with an orifice tube 23, which tube is centrally located within drive shaft 21. The orifice tube 23 defines an interior passage communicating with the shearing zone 19 which zone is defined by and located between planar faces 16 and 20 as will be hereinafter described. Orifice tube 23 has a nozzle 25 through which extrudate 44 is emitted. From nozzle 25, the extrudate is suitably formed into articles by conventional means.

In FIG. 1, it will be seen that the planar face of rotary element 13 is in spaced confronting relation with the planar face 20 of rotary element 12, and nonconcentric or non-axially aligned therewith. The shearing zone or gap 19 is that gap existing between the two faces. It will be understood that the visco-elastic material experiences some non-uniform shear stress, as it flows to the shearing zone in contact with the stationary housing. These stresses are insignificant as compared to the stresses developed in the shearing zone. The present extruder then is a rotor/rotor extruder in contrast to the rotor/stator extruder of the prior art.

Figure 2:
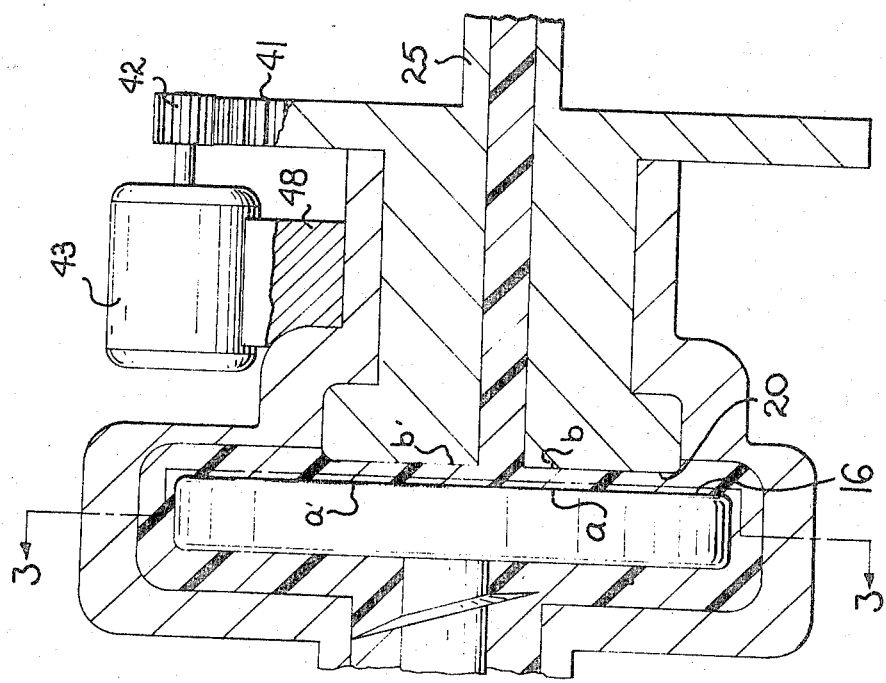
FIG. 2 is a vertical sectional view of the extruder of FIG. 1.
Figure 3:
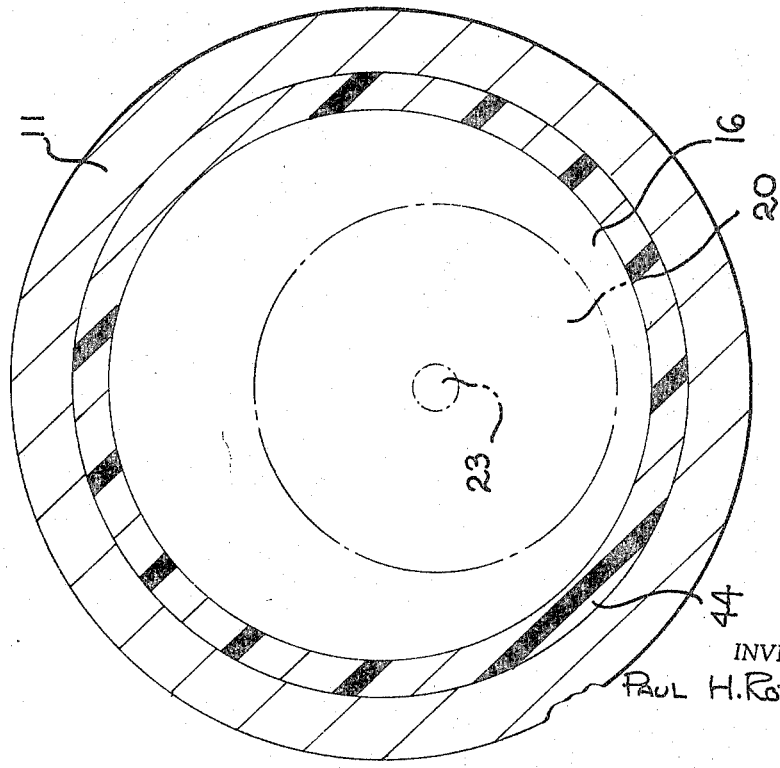
FIG. 3 is a sectional view taken along the plane 3—3 of FIG. 2.

The functional principles of the present invention will become more apparent from the following description taken in conjunction with FIG. 2 and FIG. 3.

In the rotor/rotor elastic melt extruder of invention the shear strain per revolution is proportional to $$2\pi A/T$$

wherein:

A is the radial distance between the axes of rotation of the two rotary elements and,
T is the axial distance between the two rotary elements.

The shear strain is then controlled by two factors:

(1) One factor is the radial distance between the axes of rotation of the two rotors with the shear strain increasing with increasing radial displacement.

(2) The second factor is the axial distance between the rotors, with the shear strain increasing with decreasing axial displacement.

The shear strain rate then is proportional to:

$$(2\pi A/T)^\omega$$

wherein A and T are as defined above, and $\omega$ is the angular velocity (i.e. r.p.m.).

The shear strain rate is then governed by angular velocity of the rotors, with shear strain rate increasing with increasing angular velocity.

Since there are two independent variables (i.e. A and T) controlling the shear characteristic, the operational characteristics of the extruder can be designed to match the properties of the visco-elastic extrudate.

In operation, the controlled shear strain rate is attained by extruding the thermoplastic material in the shearing gap existing between the confronting faces of the rotating discs or rotors while the discs are rotating in the same direction.

Since the two rotors are non-concentric and are rotating in the same relative direction, the shear strain rate will be determined by the three factors as discussed above, and the shear strain rate gradient will be determined by one factor. The shear strain rate gradient is discussed below.

The ratio of the angular velocities of the two rotors determines the shear strain rate gradient. When the ratio of the angular velocities of the two rotors is one (i.e. when both rotors are revolving at the same r.p.m. the shear strain rate gradient is zero. The condition is preferred in ordinary extrusion applications. The shear strain rate gradient is zero when the ratios of the angular velocities is one because the only shearing force experienced by material within the shearing zone is caused by the radial distance between the axes of rotation of the two rotors. This can be explained by reference to FIG. 2. Consider point $a$ on planar face 16 and point $b$ on planar face 20. These points are directly confronting. When both of the faces have rotated 180°, points $a'$ and $b'$ are no longer directly confronting and are radially displaced a distance proportional to the radial distance between the axes of rotation of the two rotors. Acscordingly, the plastic material between these rotating faces undergoes a shearing force proportional to the distance between points $a'$ and $b'$. Accordingly, the shear rate gradient is zero throughout the shearing zone since this analysis applies to any pair of confronting points on the planar faces.

When a shear strain rate gradient is desired the angular velocities of the two rotors are in a ratio other than one with the shear strain rate gradient increasing as the difference between the angular velocities of the rotors increases. The shear strain rate gradient is thereby controlled.

From the foregoing, it is apparent that the present invention provides a method and apparatus for extruding thermoplastic materials under controlled shear strain rate gradients at predetermined rates of shear strain. It is also apparent that the present invention is particularly advantageous in commercial extrusion processes where uniform shear rates (shear rate gradients of zero) are preferred.

I claim:

1. An apparatus for extruding a visco-elastic plastic material comprising in combination,
   a housing defining an interior chamber,
   a pair of rotatable, non-coaxial, shearing elements positioned within said chamber, said elements having spaced confronting faces, said faces defining a shearing zone, one of said elements having an extrudate outlet opening, said opening communicating with said shearing zone, rotative means for rotating said elements in the same direction, and means for supplying visco-elastic plastic material between said spaced confronting faces.

2. The apparatus of claim 1 wherein said confronting faces are in the form of circular discs.

3. The apparatus of claim 2 wherein each of said circular discs are mounted on a cylindrical rotatable shaft and each of said shafts is driven by said rotative means.

4. The apparatus of claim 3 wherein said means for supplying visco-elastic material comprises a hopper communicating with said chamber through a peripheral aperture in said housing.

5. The apparatus of claim 4 wherein said extrudate opening comprises an orifice tube, said tube axially extending through one of said cylindrical shafts.

6. The apparatus of claim 5 further including an extrusion nozzle mounted on said orifice tube.

7. The apparatus of claim 6 further including a helical screw, radially mounted on one of said shafts, said screw communicating with said aperture so as to advance said visco-elastic material toward said shearing zone as said shaft is rotated.

8. In an elastic melt extruder wherein a plastic material is plasticized and extruded by the visco-elastic effect between shearing elements confined in a housing, the improvement comprising, a pair of rotatable, non-coaxially aligned, shearing elements having spaced confronting faces, said faces defining a shearing zone, means for allowing egress of said plastic material from said shearing zone to the outlet of said extruder, means for rotating said elements in the same direction, and means for supplying visco-elastic plastic material between said spaced confronting faces.

9. The method of plasticizing and extruding a visco-elastic plastic material comprising the steps of, supplying the material to the shearing zone defined between the spaced, confronting faces of a pair of non-coaxial, rotatable, shearing elements, rotating said elements in the same direction, extruding the visco-elastic material through an outlet opening in one of said shearing elements by the visco-elastic force developed between the rotating shearing elements.

10. The method of claim 9 wherein said elements are rotating at the same angular velocity.

11. The method of extruding a visco-elastic material under uniform conditions of shear comprising the steps of supplying the material to the shearing zone defined between the spaced confronting faces of a pair of rotatable, non-coaxial, shearing elements, rotating said elements in the same direction at the same angular velocity, and extruding the visco-elastic material through an outlet opening in one of said shearing elements by the visco-elastic force developed between the rotating shearing elements.

12. In the method of extruding a thermoplastic material by the visco-elastic effect exerted in a shearing gap between the confronting faces of a pair of rotatable elements wherein extrudate flows through an opening in one of said faces, the steps of maintaining the rotary axes of said elements in non-coaxial alignment, rotating said elements in the same relative direction of rotation, and maintaining the relative angular velocities of said pair of rotatable elements at a preselected ratio whereby the shear rate gradient existing in said shearing gap is effectively controlled.

References Cited

UNITED STATES PATENTS

| | | | |
|---|---|---|---|
| 2,745,321 | 5/1956 | Bowers | 18—2 X |
| 2,977,632 | 4/1961 | Bunch | 18—12 X |
| 3,343,212 | 9/1967 | Adams | 18—12 |
| 3,351,694 | 11/1967 | Curto et al. | 264—176 |

ROBERT F. WHITE, Primary Examiner

K. J. HOVET, Assistant Examiner

U.S. Cl. X.R.

18—12; 264—329, 349